(12) United States Patent
Dubosc

(10) Patent No.: US 12,311,832 B2
(45) Date of Patent: May 27, 2025

(54) LIGHT INDICATION OF THE POSITION OF A FRAME CLOSING ELEMENT

(71) Applicant: VALEO VISION, Bobigny (FR)

(72) Inventor: Christophe Dubosc, Bobigny (FR)

(73) Assignee: VALEO VISION, Bobigny (FR)

( * ) Notice: Subject to any disclaimer, the term of this patent is extended or adjusted under 35 U.S.C. 154(b) by 172 days.

(21) Appl. No.: 18/255,977

(22) PCT Filed: Dec. 13, 2021

(86) PCT No.: PCT/EP2021/085395
§ 371 (c)(1),
(2) Date: Jun. 5, 2023

(87) PCT Pub. No.: WO2022/128865
PCT Pub. Date: Jun. 23, 2022

(65) Prior Publication Data
US 2024/0042921 A1     Feb. 8, 2024

(30) Foreign Application Priority Data
Dec. 15, 2020  (FR) ........................... 2013269

(51) Int. Cl.
*B60Q 1/26*     (2006.01)
(52) U.S. Cl.
CPC ......... *B60Q 1/2661* (2013.01); *B60Q 1/2692* (2013.01)
(58) Field of Classification Search
CPC .............................. B60Q 1/2661; B60Q 1/2692
See application file for complete search history.

(56) References Cited

U.S. PATENT DOCUMENTS

| | | | |
|---|---|---|---|
| 5,125,714 A * | 6/1992 | Lecher ................. | B60K 11/085 296/180.5 |
| 8,292,014 B2 * | 10/2012 | Sugiyama ............ | B60K 11/085 180/68.1 |
| 9,909,747 B2 * | 3/2018 | Salter .................... | B60Q 1/549 |

(Continued)

FOREIGN PATENT DOCUMENTS

| DE | 540 655 C | 12/1931 |
|---|---|---|
| DE | 10 2009 039 038 A1 | 3/2011 |

(Continued)

OTHER PUBLICATIONS

International Search Report issued Mar. 2, 2022 in PCT/EP2021/085395 filed on Dec. 13, 2021 therein 3 pages.

(Continued)

*Primary Examiner* — Arman B Fallahkhair
(74) *Attorney, Agent, or Firm* — Oblon, McClelland, Maier & Neustadt, L.L.P.

(57) ABSTRACT

An assembly for a motor vehicle includes a frame which defines an opening and a closing element and which can be moved between a first position in which the closing element at least partially closes the opening; and a second position in which the opening is open. The assembly further includes a lighting device configured to project a light beam onto the closing element when the latter is positioned in the second position and/or onto the closing element when the latter is moving between the first position and the second position, at least a portion of the projected light beam being reflected by the closing element out of the assembly.

19 Claims, 3 Drawing Sheets

(56) References Cited

U.S. PATENT DOCUMENTS

Figure 1A:
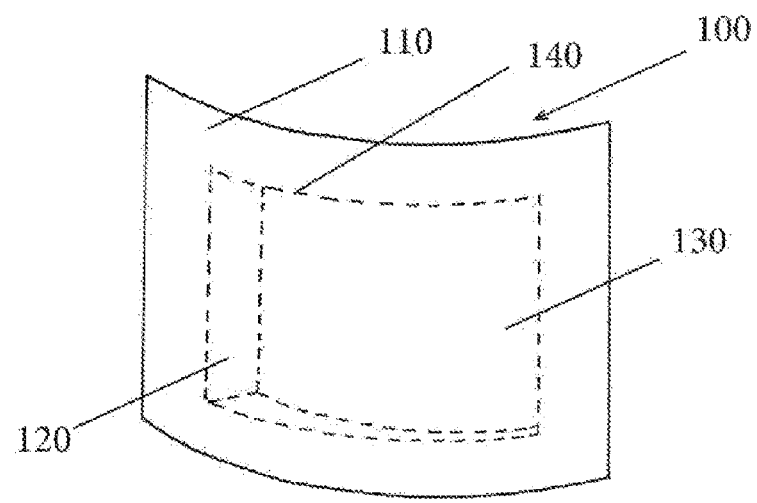

| | | | |
|---|---|---|---|
| 10,625,596 B2* | 4/2020 | Laurent | B60K 11/085 |
| 10,753,571 B2* | 8/2020 | Schubert | F21S 45/37 |
| 11,614,579 B2* | 3/2023 | Wright | G02B 6/0061 |
| | | | 362/606 |
| 2012/0257403 A1 | 10/2012 | Wilfert | |
| 2015/0092436 A1* | 4/2015 | King | F21S 41/663 |
| | | | 362/513 |
| 2018/0264933 A1 | 9/2018 | Laurent et al. | |
| 2020/0276891 A1* | 9/2020 | van Doleweerd | |
| | | | B32B 17/10036 |

FOREIGN PATENT DOCUMENTS

| | | |
|---|---|---|
| DE | 10 2014 106 264 A1 | 11/2015 |
| DE | 10 2019 112 440 A1 | 11/2020 |
| EP | 2 589 859 A1 | 5/2013 |
| EP | 3 350 006 A1 | 7/2018 |
| FR | 3 090 559 A1 | 6/2020 |
| GB | 2 325 514 A | 11/1998 |
| GB | 2489787 A | 10/2012 |
| JP | 2004-306713 A | 11/2004 |

OTHER PUBLICATIONS

French Search Report issued Jun. 29, 2021 in French application 2013269 filed on Dec. 15, 2020 (with English Translation of Categories of cited documents) therein 4 pages.

* cited by examiner

LIGHT INDICATION OF THE POSITION OF A FRAME CLOSING ELEMENT

The present invention belongs to the field of the indication of a function on a frame for a motor vehicle. It relates in particular to a device making it possible to indicate a closure element of a frame, which can be arranged in the wall of a vehicle.

It is particularly advantageous in the case where the closure element is used to release an opening to ventilate/cool a component located behind the frame or to ventilate the interior of the vehicle.

Document U.S. Pat. No. 5,125,714 A describes a vehicle comprising a flap making it possible to reveal a lighting device and a ventilation/cooling device arranged one above the other. The flap can reveal either device, or both at the same time. However, it is difficult for an external observer to know whether this ventilation/cooling device is in operation, in particular when the flap reveals the ventilation/cooling device and the lighting device at the same time.

There is thus a need to identify the operating state of the ventilation/cooling device, in particular for a motor vehicle.

The present invention improves the situation.

To this end, a first aspect of the invention relates to an assembly for a motor vehicle comprising:
  a frame delimiting an opening;
  a closure element movable between:
    a first position in which the closure element at least partially closes the opening; and
    a second position in which the opening is released.

The assembly further comprises a luminous device arranged to project a light beam onto the closure element positioned in the second position and/or onto the closure element during the movement of the closure element between the first position and the second position, at least a portion of the projected light beam being reflected by the closure element out of the assembly.

Frame means any physical structure dedicated to maintaining or supporting at least one element, whatever its function. For example, the frame of the assembly according to the invention can be integrated into an exterior wall of a vehicle or an interior wall such as a dashboard with an integrated ventilation or air-conditioning function.

The projection of a light beam onto the closure element makes it possible to identify the passage into the second position and thus to indicate the open position, without hindering the movement of the closure element. Moreover, when the light beam is projected during the movement of the closure element, the kinematics of movement is made visible, the light beam reflected out of the assembly varying with the movement of the closure element. When the light beam is projected only when the closure element is in the second position, the activation of the luminous device is reduced, which makes it possible to limit the energy consumption of the luminous device.

Thus, the proposed assembly makes it possible to indicate by light the state of opening/closing of a closure element forming part of a ventilation/cooling device for a vehicle. This helps to identify the operating status of this ventilation/cooling device.

According to one embodiment, the second position of the closure element defines the interior of the frame and the luminous device can be in an interior surface of the frame or in a thickness of the frame.

Thus, the light emitted directly by the light source, without being reflected by the closure element, is limited, which makes it possible to improve the visibility of the light beam reflected by the closure element.

According to one embodiment, the luminous device can be arranged along the opening of the frame. By way of example, the luminous device can be arranged on an edge forming an integral part of the frame.

The luminous device can be arranged to emit light rays directly out of the assembly.

This embodiment makes it possible to make the position of the frame, and therefore the position of the opening, visible, even when the closure element is in the first position. In this way, the location where the ventilation/cooling function takes place is made visible to the user.

In addition, the luminous device can be arranged so that the light rays emitted directly out of the assembly perform a signaling function.

Thus, one and the same light projection device is capable of performing a signaling function, for example of the vehicle, and a function of indicating the position of the closure element. No restriction is attached to what is understood by "signaling function", which may be a daytime running light (DRL) function, a brake light function, a position light function or an indicator light function, for example.

According to one embodiment, the closure element may be a flap pivoting around an axis associated with the frame between the first position and the second position. Said axis, called pivot axis, can be the axis of a hinge forming part of the assembly and connecting the closure element to the frame.

The luminous device may comprise at least one light source, for example at least one light-emitting diode (LED). The luminous device may further comprise a shaping device capable of forming a light beam from the light rays emitted by the light source.

According to one embodiment, the assembly may comprise a plurality of luminous devices arranged on the frame along the opening. Said plurality of luminous devices can be arranged on an edge of the frame.

Such an embodiment makes it possible to personalize the signaling function, depending in particular on the shape of the junction between the wall and the closure element.

According to one embodiment, in the first position, the closure element can completely close the opening and ensure continuity of the frame. The aerodynamics of the frame as well as the discretion of the closure element are improved in the first position.

According to one embodiment of the invention, the closure element may comprise a reflective surface able to reflect in a directive manner the light rays emitted by the luminous device.

According to one embodiment, the closure element may comprise a diffusing surface able to reflect by diffusion the light rays toward the outside of the wall upon reception of the light beam emitted by the luminous device.

According to one embodiment, the frame and the closure element are formed in one piece. In particular, the frame and the closure element are joined by a connection devoid of a hinge. The mobility of the closure element is then permitted by the flexibility of the material forming it. It is thus possible to minimize the clearances between the opening and the closure element in the first position.

A second aspect of the invention relates to a vehicle wall equipped with an assembly according to the first aspect of the invention, wherein the frame can be integrated into the vehicle wall. For example, the vehicle wall can be a bumper of the vehicle. In this example, the frame of the assembly according to the first aspect of the invention is then integrated into the bumper of the vehicle.

A third aspect of the invention relates to a vehicle comprising an assembly according to the first aspect of the invention or a vehicle wall according to the second aspect of the invention.

Figure 1B:
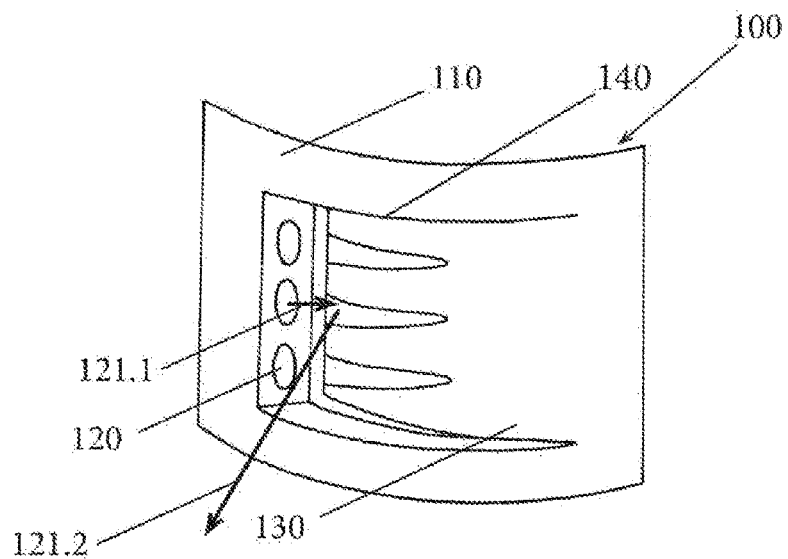
Figure 1C:
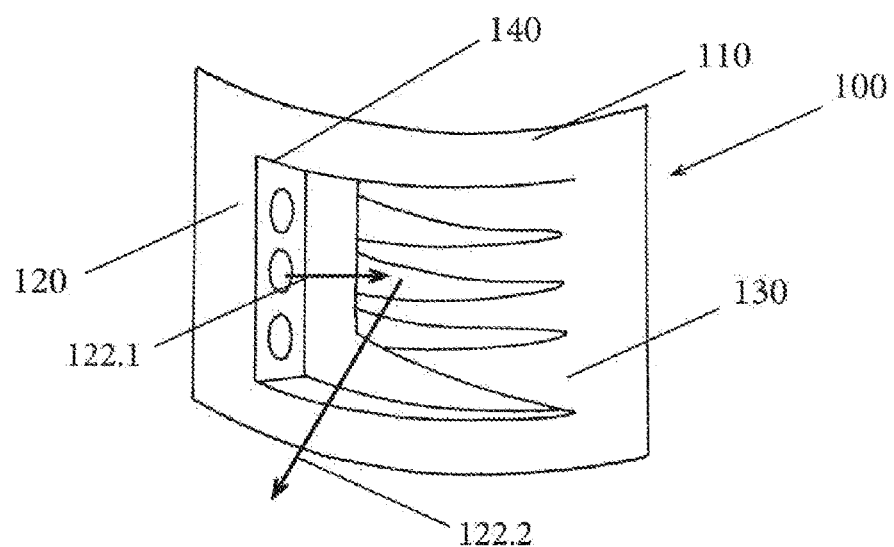
Figure 2A:
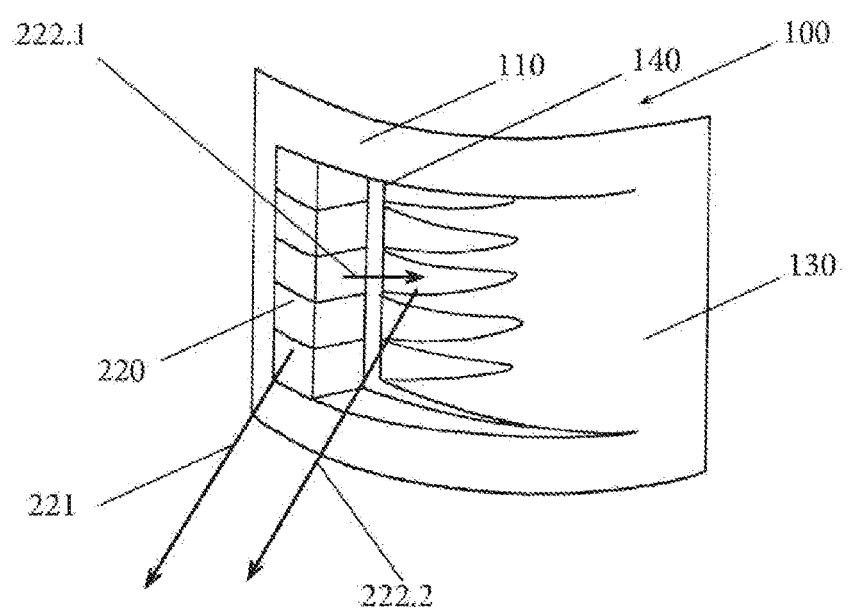
Figure 2B:
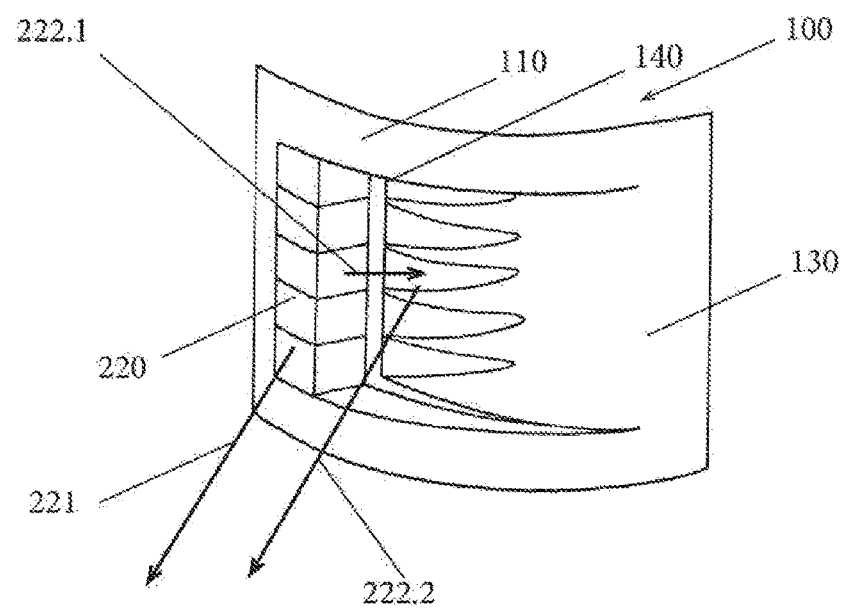
Figure 2C:
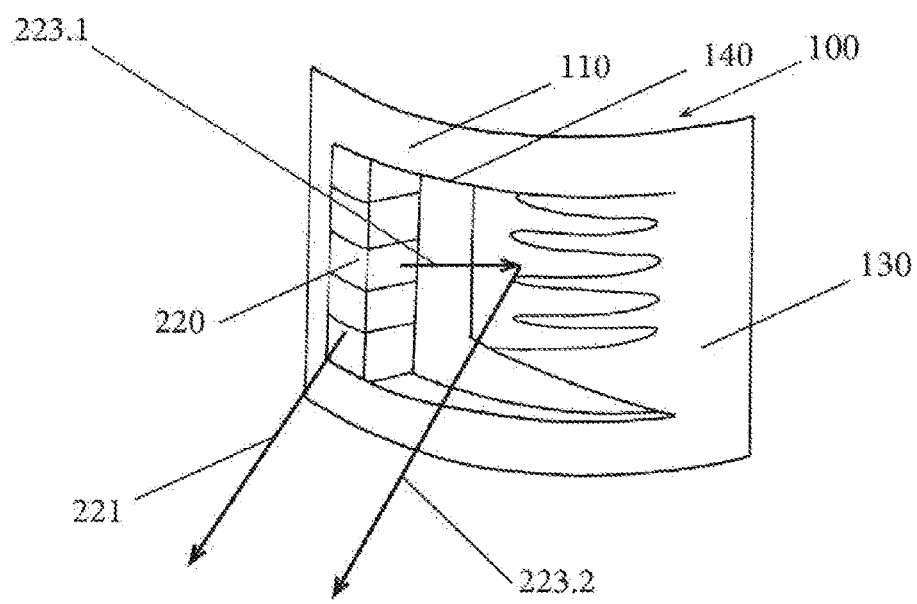

Other features and advantages of the invention will become apparent on examining the following detailed description and the appended drawings, in which:

FIG. 1*a* illustrates an assembly comprising a closure element in a first position, according to a first embodiment of the invention;

FIG. 1*b* illustrates an assembly comprising a closure element in an intermediate position, according to a first embodiment of the invention;

FIG. 1*c* illustrates an assembly comprising a closure element in a second position, according to a first embodiment of the invention;

FIG. 2 *a* illustrates an assembly comprising a closure element in a first position, according to a second embodiment of the invention;

FIG. 2*b* illustrates an assembly comprising a closure element in an intermediate position, according to a second embodiment of the invention;

FIG. 2*c* illustrates an assembly comprising a closure element in a second position, according to a second embodiment of the invention.

FIGS. 1*a* to 1*c* show an assembly 100 according to a first embodiment of the invention.

The assembly 100 comprises a closure element 130, a frame 110, and a luminous device 120. The frame 110 can be integrated into a wall of a vehicle, for example into a bumper.

The closure element is configured to at least partially close an opening 140 of the frame 110. In the figures described here, the closure is complete and the opening is only apparent in figures Tb and Tc. However, the invention applies equally to the case where the closure element 130 only partially closes the opening 140.

The closure element 120 is movable and configured to adopt at least a first position, illustrated in FIG. 1*a*, and a second position illustrated in FIG. 1*c*, FIG. 1*b* illustrating an intermediate position between the first position and the second position.

In the first position, with the shape of the closure element 130 being complementary to that of the frame 110, the aerodynamics of the frame is optimized as well as the esthetic appearance, which is advantageous in the case where the frame is integrated into the wall of a vehicle, such as a bumper for example.

The closure element 130 is thus not visible in the first position in FIG. 1*c*, according to the first embodiment.

In the intermediate position of figure Tb, the closure element 110 moves toward the inside of the frame 110, thus partially releasing the opening 140. Air can thus penetrate behind the frame 110 thus providing a cooling function to a component located behind the frame, not shown in the figures, as may be the case when the frame is in the bumper of a vehicle, or to create an air circuit, for example to cool the interior of the vehicle. The aerodynamics of the vehicle is, however, reduced when the closure element 130 is in the second position.

As shown in figure Tb, the luminous device 120 projects a light beam toward the inside of the wall 110. To this end, the luminous device 120 can be arranged in the interior of the frame 110, which may correspond to the interior of the vehicle, or even in the thickness of the frame 110, as shown in FIGS. 1*b* and 1*c*. The interior of the frame is defined according to the invention by the second position of the closure element.

Consequently, when the closure element 110 is not in the first position, the surface of the closure element 130 reflects a portion of the light beam emitted by the light projection device 120, out of the assembly 100, here toward the exterior of the frame 110. A light ray 121.1 emitted by the luminous device 120 is thus reflected toward the exterior as a light ray 121.2.

In order to reflect at least a portion of the light beam emitted by the luminous device 120, the surface of the closure element 130 may be capable of reflecting in a directive manner or by diffusion. The light ray 121.2 is therefore either reflected in a directive manner or diffused. Examples of reflective or diffusing materials or coatings are well known and are not further explained in the present description.

FIG. 1*c* illustrates an assembly 100 according to the first embodiment, when the closure element 130 is in the second position. In this second position, the air inlet is maximum, which allows aeration/ventilation behind the frame 110 and in particular the cooling of a component of the vehicle located behind the frame 110, such as brakes, a battery or a motor, not shown in the figures.

Furthermore, as represented with reference to FIG. 1*b* above, the luminous device 120 emits a light beam which is at least partially reflected by the closure element 130 toward the exterior of the frame 110. The light ray 122.1 illustrated in FIG. 1*c* and emitted by the luminous device 120 is reflected as a light ray 122.2 toward the exterior of the frame 110 by the closure element.

As illustrated in FIGS. 1*b* and 1*c*, the light beam reflected by the closure element 130 varies according to the position of the latter, which makes it possible to make visible the kinematics of the passage of the closure element 130 from the first position to the second position.

As a variant, the luminous device 120 does not emit a light beam continuously but only projects the light beam when the closure element 130 is in the second position. For this purpose, a sensor or a mechanical device is capable of detecting the second position of the closure element, so as to activate the luminous device 120. In this variant, no luminous indication is observable in the intermediate position illustrated in FIG. 1*b*.

In the example shown in FIGS. 1*a* to 1*c*, the assembly 100 comprises four luminous devices 120. However, no restriction is attached to the number of luminous devices 120, which can be any number greater than or equal to 1. Furthermore, the luminous devices illustrated are circular. No restriction is attached to their shape, which may be rectangular, square, circular, oval, etc.

No restriction is attached to the movement mechanism of the closure element 120. The closure element 130 can be a flap which pivots around an axis between a first closed position and a second open position. Such an axis, called pivot axis, can be the axis of a hinge forming part of the assembly and connecting the closure element to the frame 110. As a variant, the closure element 130 can be moved by translation, in particular toward the interior of the frame 110. In another variant, the frame 110 and the closure element 130 are formed in one piece. The junction between the frame 110 and the closure element 130 is then devoid of a hinge or any other element. The mobility of the closure element 130 is then permitted by the flexibility of the material forming it. The invention applies equally to other variants, the closure element 130 being defined by its ability to ensure, at least partially, continuity of the wall in a first position (complementary shape of the wall), and the release of the opening 140, in a second position (ability to move away from the frame 110 toward the interior).

FIGS. 2a to 2c show the assembly 100 according to a second embodiment of the invention.

In this second embodiment, only the light projection device(s) 220 differ(s) from the luminous devices 120 of FIGS. 1a to 1c. Specifically, the luminous device 220 is capable of emitting light directly out of the assembly 100, in particular the light ray 221. For this purpose, the luminous device 220 can be mounted in the thickness and on an outer surface of the frame 110. As a variant, the luminous device 220 can be mounted inside and outside the frame 110, with no light beam being projected from the thickness of the wall 110. The luminous devices 220 have been shown in rectangular form. However, as for the luminous devices 120, no restriction is attached to their shape.

Thus, even in the first position illustrated in FIG. 2a, the light projection device 220 makes a border of the opening 140 visible. In the intermediate position and in the second position, the luminous device 220 emits light rays 221 directly outward and further emits light rays 222.1 and 223.1 reflected by the closure element 130 as rays 222.2 and 232.2, respectively.

As for the first embodiment, in FIGS. 2a to 2c a plurality of luminous devices 220 have been illustrated. However, no restriction is attached to the number of luminous devices 220, which may be any number greater than or equal to 1.

As illustrated in FIGS. 2b and 2c, the light beam reflected by the closure element 130 varies according to the position of the latter, which makes it possible to make visible the kinematics of the passage of the closure element 130 from the first position to the second position.

The second embodiment makes it possible to make visible both the position of the opening in the closed position, as well as the movement kinematics of the closure element 130 during its passage into the second position.

As a variant, the luminous device 220 emitting the direct light rays 221 toward the exterior of the frame 110 and the luminous device 220 emitting the light rays 222.1 and 223.1 toward the interior of the frame 110 can be distinct. In this variant, the luminous device 220 illuminating toward the interior of the frame 110 can be activated only in the second position, or else as soon as the opening of the closure element 130 begins.

According to the second embodiment, the luminous device 220 can take part in a function other than the indication of the position of the opening 120 and of the movement kinematics of the closure element 120. For example, the luminous device 220 can take part in a signaling function, such as a vehicle daytime signaling function, of the daytime running light (DRL) type for example, which makes it possible to improve the visibility of the vehicle from the outside, in particular for other road users.

As for the first embodiment, in order to reflect at least a portion of the light beam emitted by the luminous device 220, the surface of the closure element 130 can be reflective or diffusing. The light rays 222.2 and 223.2 are thus either reflected in a directive manner or diffused. Examples of reflective or diffusing materials or coatings are well known and are not further explained in the present description.

For the two embodiments presented, no restriction is attached to the technology used for the luminous devices, these being able to be based on light-emitting diodes (LEDs) with at least one photoemissive element, or any other light emission technology (laser, matrix laser, xenon, halogen, in particular). An LED has the advantage of a good quality of light beam in relation to their cost. The luminous device 120 may comprise at least one light source as well as a shaping device arranged to project a light beam, not shown in the figures. The shaping device can be a projection optic, or a diffusing optical element.

Moreover, in the description of the figures above, the luminous device 120 or 220 illuminates the closure element 130 during its movement between the first and second positions. As a variant, the luminous device 120 or 220 projects a light beam onto the closure element 130 only when the closure element 130 is in the second position, which makes it possible to make the open position of the closure element visible while reducing the energy consumption of the luminous device. In both cases, the assembly comprising the luminous device 120 and 220 can be controlled by a control unit to participate in an ignition scenario activated when the vehicle is started. This ignition scenario is also called a "welcome scenario", which makes it possible to further satisfy the user of the vehicle.

The present invention is not limited to the embodiments described above by way of example and encompasses other variants.

The invention claimed is:

1. An assembly for a motor vehicle comprising a frame delimiting an opening for a ventilation device of the vehicle; a closure element movable between a first position in which said closure element at least partially closes the opening and a second position in which the opening is released; wherein the assembly further comprises a luminous device arranged in an interior surface of the frame or in a thickness of the frame, such that the luminous device is capable of projecting a light beam onto the closure element in the second position and during the movement of the closure element between the first position and the second position and is further capable of emitting light rays directly out of the assembly to perform a signaling function, at least a portion of the projected light beam being reflected by the closure element out of the assembly.

2. The assembly according to claim 1, wherein the second position of the closure element defines an interior of the frame.

3. The assembly according to claim 2, wherein the luminous device is arranged along the opening of the frame and wherein the luminous device is further arranged to emit light rays directly out of the assembly.

4. The assembly according to claim 2, comprising a plurality of luminous devices arranged on the frame along the opening.

5. The assembly according to claim 2, wherein, in the first position, the closure element completely closes the opening and ensures continuity of the frame.

6. The assembly according to claim 2, wherein the closure element comprises a reflective surface able to reflect in a directive manner the light rays emitted by the luminous device.

7. The assembly according to claim 2, wherein the closure element comprises a diffusing surface able to reflect by diffusion light rays emitted by the luminous device.

8. A vehicle wall equipped with an assembly according to claim 2, wherein the frame is integrated into the vehicle wall.

9. A vehicle comprising an assembly according to claim 2.

10. The assembly according to claim 1, wherein the luminous device is arranged along the opening of the frame.

11. The assembly according to claim 10, comprising a plurality of luminous devices arranged on the frame along the opening.

12. The assembly according to claim 10, wherein, in the first position, the closure element completely closes the opening and ensures continuity of the frame.

13. The assembly according to claim 10, wherein the closure element comprises a reflective surface able to reflect in a directive manner the light rays emitted by the luminous device.

14. The assembly according to claim 1, comprising a plurality of luminous devices arranged on the frame along the opening.

15. The assembly according to claim 1, wherein, in the first position, the closure element completely closes the opening and ensures continuity of the frame.

16. The assembly according to claim 1, wherein the closure element comprises a reflective surface able to reflect in a directive manner the light rays emitted by the luminous device.

17. The assembly according to claim 1, wherein the closure element comprises a diffusing surface able to reflect by diffusion light rays emitted by the luminous device.

18. A vehicle wall equipped with an assembly according to claim 1, wherein the frame is integrated into the vehicle wall.

19. A vehicle comprising an assembly according to claim 1.

* * * * *